US005247157A

United States Patent [19]

Spendlove

[11] Patent Number: 5,247,157

[45] Date of Patent: Sep. 21, 1993

[54] APPARATUS FOR DEVELOPING HEAT WITHIN CONDUCTIVE MATERIALS USING HEAT-RESISTANT RIBBON HEATERS

[76] Inventor: Max J. Spendlove, 13121 Clifton Rd., Silver Spring, Md. 20904

[21] Appl. No.: 879,924

[22] Filed: May 8, 1992

Related U.S. Application Data

[63] Continuation-in-part of Ser. No. 482,061, Feb. 20, 1990, Pat. No. 5,124,520.

[51] Int. Cl.[5] .......... H05B 1/00; B23K 3/00

[52] U.S. Cl. .......... 219/234; 219/50; 219/90; 219/230; 219/233; 219/243; 219/535; 225/93.5

[58] Field of Search .......... 219/233–235, 219/535, 243, 221, 227, 228, 90, 50, 230; 225/93.5

[56] References Cited

U.S. PATENT DOCUMENTS

| | | | |
|---|---|---|---|
| 909,451 | 1/1909 | Pierce . | |
| 1,807,004 | 5/1931 | Nelson . | |
| 1,869,448 | 8/1932 | Woodring . | |
| 2,001,538 | 5/1935 | Mueller et al. . | |
| 2,139,499 | 12/1938 | Howie . | |
| 2,226,194 | 12/1940 | Berolsky . | |
| 2,304,975 | 12/1942 | Warrender | 219/90 |
| 2,436,887 | 3/1948 | Hensley . | |
| 2,476,680 | 7/1949 | Norgard | 219/233 X |
| 2,577,515 | 12/1951 | Durst | 219/90 |
| 2,618,728 | 11/1952 | Bram | 219/243 |
| 2,969,449 | 1/1961 | Tyler . | |
| 3,062,944 | 11/1962 | Grandel | 219/227 X |
| 3,296,415 | 1/1967 | Eisler | 219/243 X |
| 3,321,953 | 5/1967 | Roveti | 219/233 X |
| 3,412,233 | 11/1968 | Wilkie . | |
| 3,673,384 | 6/1972 | Burman et al. | 219/230 |
| 3,752,017 | 8/1973 | Lloyd et al. | 219/230 X |
| 4,205,221 | 3/1980 | Meyer . | |
| 4,367,397 | 1/1983 | Henderson | 219/90 |
| 4,626,658 | 12/1986 | Gray et al. . | |
| 5,124,520 | 6/1992 | Spendlove | 219/234 X |

FOREIGN PATENT DOCUMENTS

| | | | |
|---|---|---|---|
| 1013135 | 4/1983 | U.S.S.R. | 225/93.5 |
| 524530 | 8/1940 | United Kingdom | 219/228 |

*Primary Examiner*—Anthony Bartis
*Attorney, Agent, or Firm*—Burns, Doane, Swecker & Mathis

[57] ABSTRACT

An apparatus for electrically heating an electrically conductive workpiece by passage of electric current therethrough includes a pair of hinged levers, each having a handle end and a jaw end. The jaw end of each lever is provided with a refractory metal ribbon heater selected from the group consisting of stainless steel, Nichrome, chromel, tungsten, and molydenum. The ribbon has an elongate cross-section and is bent to form a V-shaped contactor for achieving good thermal contact with a workpiece of relatively high conductivity, such as copper, aluminum or brass pipes and fittings. A copper conductor assures good electrical contact between the ends of the metal ribbon heater and the jaw and serves as a positioning block. A bolt and wing nut detachably secure the metal ribbon heater to the jaw.

4 Claims, 2 Drawing Sheets

APPARATUS FOR DEVELOPING HEAT WITHIN CONDUCTIVE MATERIALS USING HEAT-RESISTANT RIBBON HEATERS

RELATED APPLICATION

The present application is a continuation-in-part of co-pending application Ser. No. 07/482,061, also by the present inventor, which was filed in the United States Patent and Trademark Office on Feb. 20, 1990, now U.S. Pat. No. 5,124,520 the disclosure of which is incorporated herein in its entirety.

BACKGROUND OF THE INVENTION

1. Field of the Invention

The present invention relates t a method and apparatus for developing heat within conductive materials and more particularly to such a method and apparatus wherein a large portion of the heat is developed by $I^2R$ heat energy within the material itself.

2. State of the Art

Numerous applications call for developing heat within a conductive material. Well-known examples of such applications include pipe-fitting wherein solder is melted to join copper pipe, sheet metal fastening wherein seams and overlaps are soldered, and thawing sections of frozen water pipes. Other less common applications of the present invention may include developing heat within such substances as fused electrolytes, semiconductors, powders, and mixes for whatever purpose necessary.

The best known method of heating in an application such as pipe-fitting and so forth is the use of a blow torch. The open flame produced by a blow torch, however, poses a conspicuous fire hazard, especially when used in proximity to combustible materials. To alleviate the safety hazards associated with blow torches, a number of different techniques have been proposed for electrically heating conductive materials. Such techniques typically involve the heating of resistive heating elements and conduction of heat from the heating elements to the work-piece. Because of thermal losses and poor heat transfer to the work-piece, the efficiency of such techniques is generally quite low and the time required to heat up the work-piece rather prolonged. Techniques are known wherein heat is generated in heating elements held in contact with a work-piece by the flow of electric current serially through the heating elements and the work-piece itself, as for example in U.S. Pat. No. 2,139,499. Such techniques have not concerned themselves, however, with maximizing the current through the work-piece such that the speed and efficiency of the heating operation may be optimally increased.

SUMMARY OF THE INVENTION

According to the present invention, an apparatus for heating a workpiece includes a pair of hinged levers having a handle end and a jaw end. Metal ribbon heater means is connected to the levers for contacting and transferring heat to the workpiece. In the case of a workpiece of relatively high conductivity, two metal ribbon heaters formed of a refractory metal are bent to form V-shaped contactors and are secured to the jaw end of the levers. In the case of a workpiece of relatively low conductivity, a single metal ribbon heater formed of a refractory metal is bent into a loop the ends of which are secured to the jaw end of the levers. An electric current is caused to flow through the metal ribbon heater means, causing the metal ribbon heater means to develop heat which is then transferred to the workpiece.

DETAILED DESCRIPTION OF THE PREFERRED EMBODIMENT

Two embodiments of the present invention are illustrated in FIGS. 1A to 3B and will be presently described. These two embodiments employ metal ribbon heaters instead of heating blocks and are therefore preferred from the standpoint that the metal ribbon heaters are less susceptible to heat damage.

Figure 1A:
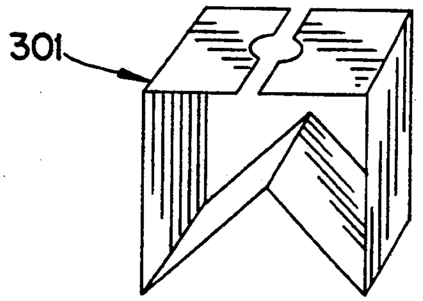
FIG. 1A is a perspective view of a V-shaped metal ribbon heater.
Figure 1B:
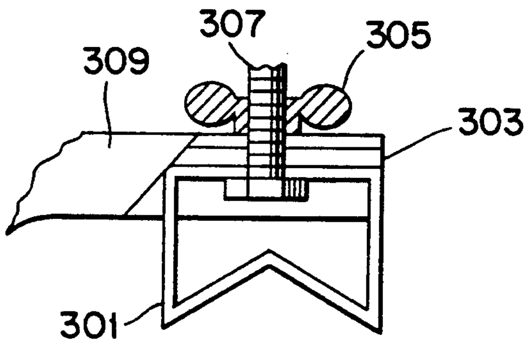
FIG. 1B is a sectional view of the V-shaped metal ribbon heater of FIG. 1A secured to the upper jaw of a clamp.

Referring now to FIG. 1A, a metal ribbon heater 301 bent to form a V-shaped contactor may be used when good thermal contact may be achieved between the ribbon heater and a workpiece of relatively high conductivity such as copper, aluminum, and brass pipes and fittings. Metal ribbon heaters such as the metal ribbon heater 301 are connected to both jaws of a connector grip of the type described in relation to FIG. 5 of my previous patent, for example. The manner of connection may be appreciated with reference to FIG. 1B. A copper conductor 303 assures good contact between the metal ribbon heater 301 and the upper jaw 309 of the connector grip and serves as a positioning block. A bolt 307 and wing nut 305 may be used to secure the metal ribbon heater 301 and the jaw 309.

The metal used to form the metal ribbon heater is preferably a metal or alloy that oxidizes very slowly at high temperatures in air. Examples of such metals include refractory metals and alloys such as stainless steel, Nichrome, chromel, nickel, chromium, tungsten and molybdenum.

Figure 3A:
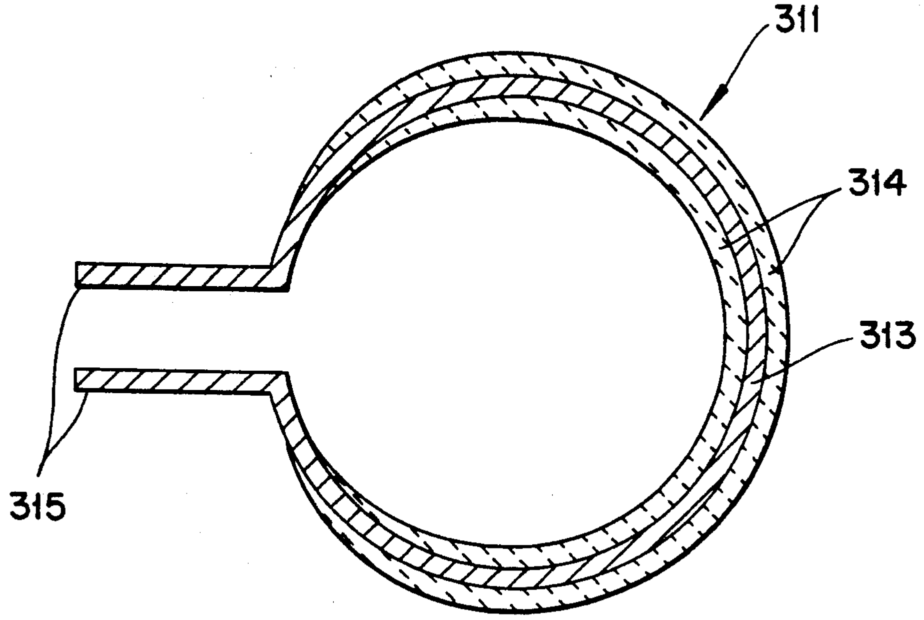
FIG. 3A is a sectional view of the ribbon heater loop of FIG. 2A showing a refractory ceramic coating thereon.
Figure 3B:
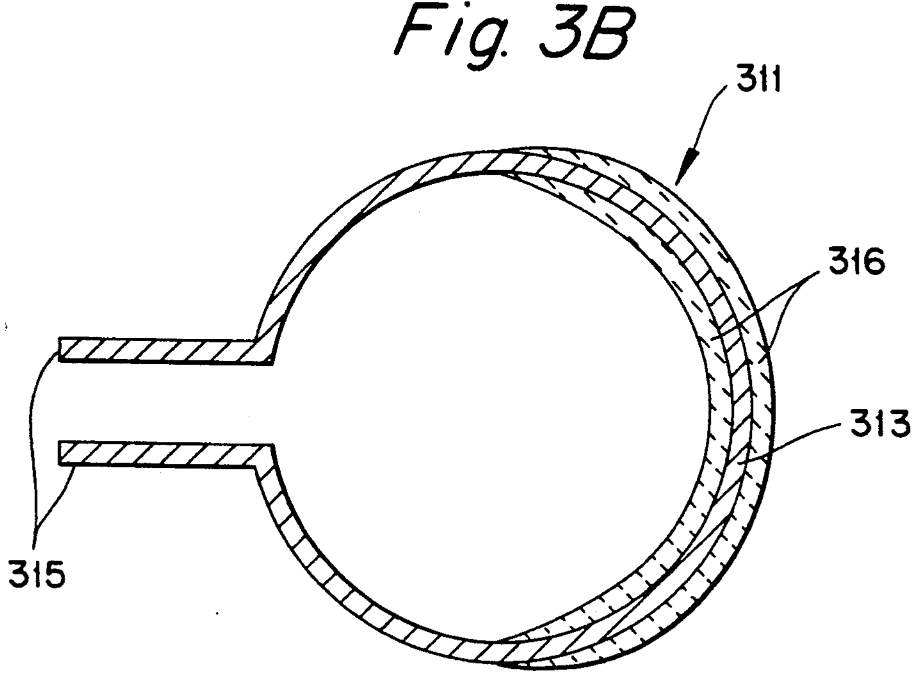
FIG. 3B is a sectional of the ribbon heater loop of FIG. 2A showing refractory ceramic saddles thereon.

When good thermal contact with the workpiece cannot be achieved, however, as when the workpiece is of a relatively low conductivity metal as in the case of nickel, iron, steel and stainless steel pipes bolts, nuts and rods, the metal ribbon heater of FIG. 1A may be susceptible to heat damage. In such a circumstance the metal ribbon heater 311 of FIG. 2A may be used instead. The metal ribbon heater 311 includes a loop portion 313 and a connector portion 315. As shown in FIG. 3A, the loop portion is coated with refractory cement 314 to prevent heat damage, whereas the connector portion 315 remains uncoated. Alternatively, two ceramic semi-cylindrical refractory saddles 316 can be used in place of the cement coating as shown in FIG. 3B.

Figure 2A:
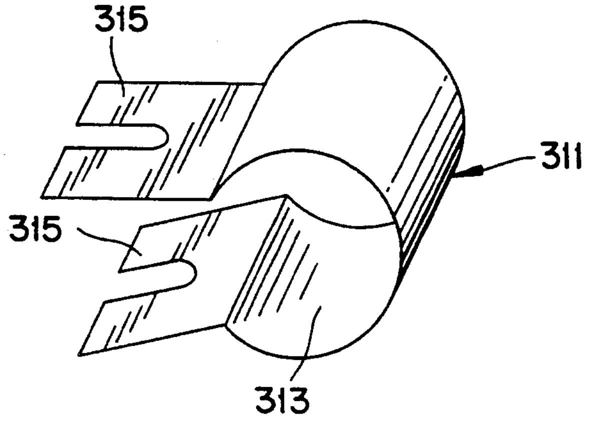
FIG. 2A is a perspective view of a loop-type metal ribbon heater.
Figure 2B:
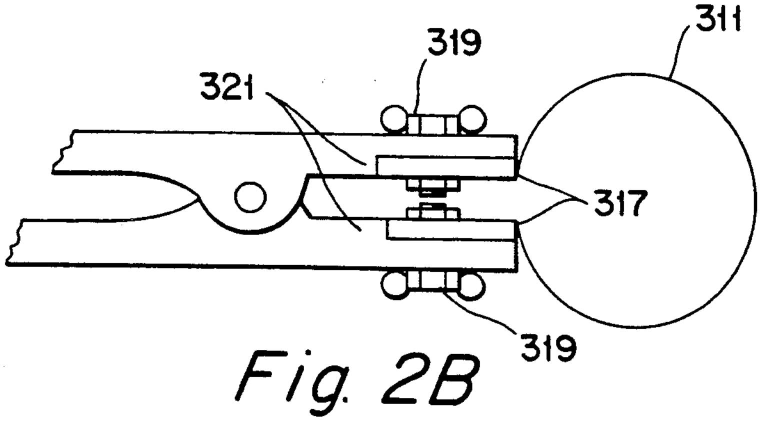
FIG. 2B is a sectional view of the loop-type metal ribbon heater of FIG. 2A secured to the jaws of a clamp.

As seen in FIG. 2B, the metal ribbon heater 311 is secured to the connector grip jaws 321 in substantially the same manner as in the previous embodiment. The uncoated connector tabs 315 are positioned on copper positioning blocks 317 and secured to the jaws using wing nuts 319.

It will be appreciated by those of ordinary skill in the art that the present invention can be embodied in other specific forms without departing from the spirit or essential character thereof. The scope of the invention is indicated by the appended claims rather than the foregoing description, and all changes which come within the meaning and range of equivalents thereof are intended to be embraced therein.

What is claimed is:

1. An apparatus for heating a workpiece, comprising;

a pair of hinged levers each having a handle end and a jaw end;

metal ribbon heater means connected to said jaw end of the respective levers for contacting and transferring heat to said workpiece, wherein said metal ribbon heater means comprises two metal ribbon heaters each having an elongate cross-section and bent in the form of a V, one connected to each of said levers; and electrification means mechanically connected to said levers and electrically connected to said metal ribbon heaters for causing an electric current to flow through said metal ribbon heaters and the workpiece, causing said metal ribbon heaters and the workpiece to develop heat.

2. The apparatus of claim 1 wherein said two metal ribbon heaters are formed of a refractory metal.

3. The apparatus of claim 1 wherein said two metal ribbon heaters are formed of a refractory metal alloy.

4. The apparatus of claim 3 wherein said two metal ribbon heaters are formed of metal including one of: stainless steel, Nichrome, chromium, tungsten, and molybdenum.

* * * * *